May 12, 1959      P. D. FOSTER      2,885,760
TILE-MOLDING MACHINE
Filed Sept. 14, 1953      2 Sheets-Sheet 1
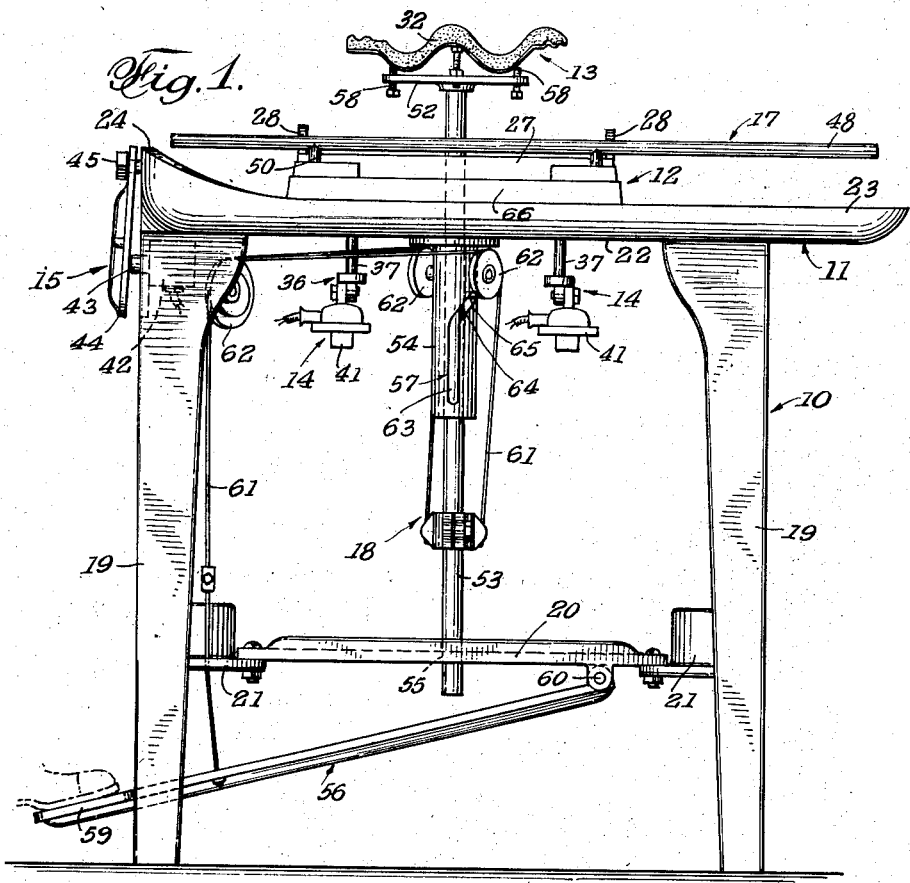
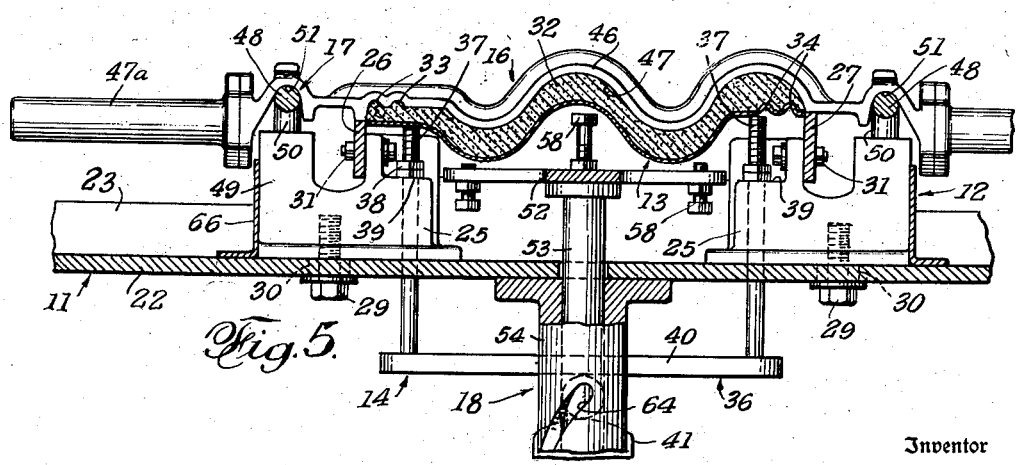
Inventor
PAUL D. FOSTER
By C. P. Stratton
Attorney May 12, 1959

P. D. FOSTER 2,885,760

TILE-MOLDING MACHINE

Filed Sept. 14, 1953

Inventor
PAUL D. FOSTER
By C. G. Stratton
Attorney

United States Patent Office 2,885,760
Patented May 12, 1959

2,885,760

TILE-MOLDING MACHINE

Paul D. Foster, San Marino, Calif.

Application September 14, 1953, Serial No. 379,947

2 Claims. (Cl. 25—43)

This invention relates to a machine for molding tile of various forms and, more particularly, cement tile that is used for roofing.

The latter tiles vary in size and/or in shape. Ordinarily a mold could produce a tile of but one size and shape and it would be necessary to provide different molds to enable production of the various sizes and shapes desired. Such molds are not only expensive but quite cumbersome to handle and, being subject to considerable wear, require frequent replacing. In order that a full range of cement roofing tiles be enabled to be produced by one machine, it is an object of this invention to provide simple and inexpensive elements that may be quickly assembled into a mold of desired size and shape and secured on the machine in proper operative position. Since the elements of such a mold can be individually replaced and/or interchanged, the economy of such a construction will be realized.

The present machine entails manual troweling of the exposed face of the tile being molded and the accuracy of said face depends on proper guiding of the trowel used for this purpose. Another object of the invention is to provide a molding machine with improved trowel-guiding means that obviate side movement or side lap of the trowel and maintain the same constantly central with respect to the mold therebeneath.

In the molding of cement tile, the substantially complete removal of occluded air from the cement is necessary to improve the molded product. A further object of the invention is to provide improved means for effecting rapid and uniform elimination of air bubbles from the mix from which the tile is molded and while the same is being troweled.

A still further object of the invention is to provide novel operating mechanism, that is actuated by the operator while performing the troweling operation, to set into operation the air bubble-eliminating means. In this manner, this important phase of a tile-molding operation cannot be omitted or forgotten and uniformity of product results.

A further object of the invention is to provide a machine, as indicated, that embodies pedal-operated means to eject a molded tile from its mold and to simultaneously rotate the same so that it is presented to the operator for most convenient removal and deposit on drying racks.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes one embodiment of the present invention, which is given by way of illustration or example only.

In the drawings, like reference characters designate similar parts in the several views.

Fig. 1 is a side elevational view of a tile-molding machine embodying a preferred form of the present invention and shown with a tile as ejected by the operator from the mold of said machine.

Figure 2:
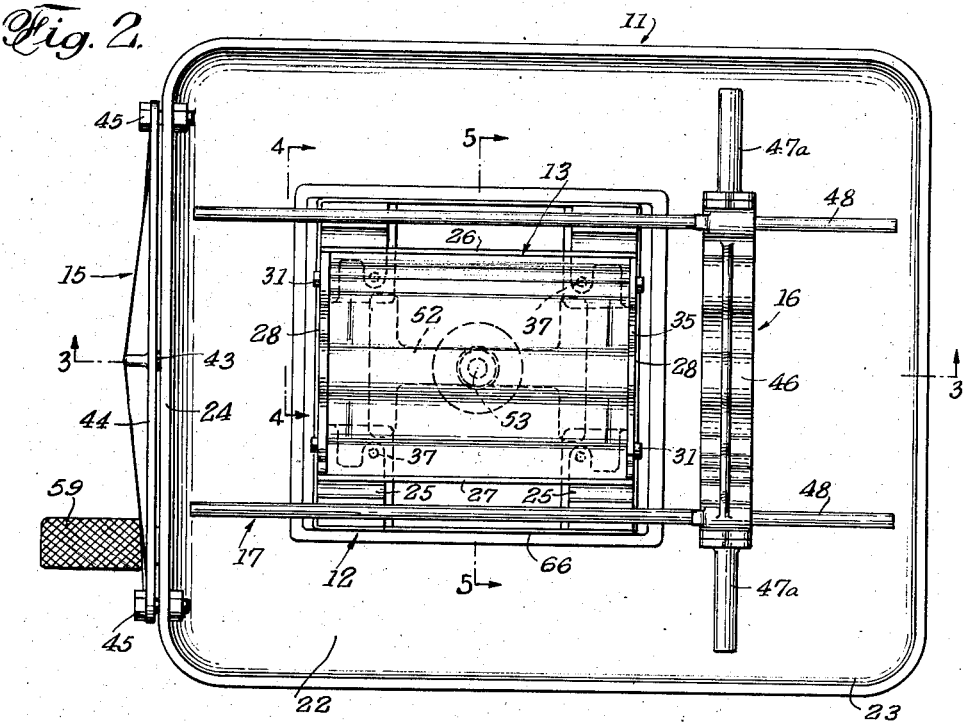
Fig. 2 is a plan view showing the machine in tile-molding position.
Figure 4:
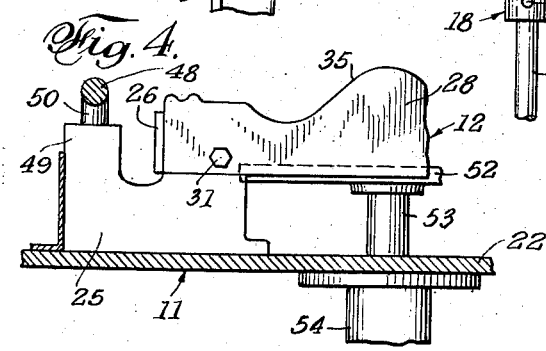

Figs. 4 and 5 are enlarged fragmentary cross-sectional views as taken on the respective lines 4—4 and 5—5 of Fig. 2.

The tile-molding machine that is illustrated comprises, generally, a frame 10 supporting a bed 11, a mold 12 adjustably carried by said bed and housing a pallet 13 that constitutes the bottom of the mold, vibratory support means 14 for said pallet, means 15 to set the vibratory support into operation, a trowel 16 to form the outer upper surface of a tile in said mold, guide means 17 for said trowel, and pedal-operated means 18 to eject the pallet 13 from the mold and simultaneously rotate the same with relation to the operator of the machine to present said pallet and a molded tile thereon in the most convenient position for removal from the machine and deposit on a drying rack.

The frame 10 is shown as two similar leg sides 19 that are connected near their lower ends by a bridge 20 extending between inwardly bowed spanning portions 21 of said leg sides 19. The bed 11 is rigidly connected to tops of said leg sides and, together with bridge 20, imparts rigidity to said frame.

The bed 11 comprises a generally rectangular plate 22 having upwardly curved marginal edges 23 that impart the bed with a capacity to hold a quantity of "mud" or cement from which the tiles are molded. The dished bed thus provided retains the cement and the curved edges, in a large measure, prevent spillage of the same from the bed. The smooth-topped bed provided in this manner minimizes injury to the fingers of the operator, the same being smooth and clear of projections that may be encountered by the operator's fingers. At one end of bed 11, the marginal wall 24 is provided, the same being substantially higher than the curved edges 23. This wall 24 is provided at the end of side of the machine at which the operator takes his position.

The mold 12 comprises four similar corner brackets 25, longitudinal metal strips 26 and 27, and transverse plates 28 that are identical. Said strips and plates are connected to the corner brackets to form a rectangular mold or form. As seen in Fig. 5, the brackets 25 are adjustably secured to the bed 22 as by bolts 29 that pass through suitably enlarged openings 30 in said bed. Thus, the longitudinal and transverse spacing of the four brackets 25 may be adjusted as desired according to the areal size of the tile to be molded. By making the lengths of strips 26 and 27 and plates 28 accordingly and connecting said strips and plates to the brackets by means of bolts 31, the fabricated mold is rendered complete and rigid. By overlapping the ends of said strips and plates at the corners, as shown in Fig. 2, an enclosed rectangular space is defined in which the pallet 13 is disposed.

As seen in Figs. 1 and 5, the tile 32 to be molded has a corrugated cross-sectional form with longitudinal beads 33 on one face that are adapted to engage in longitudinal recesses 34 in the opposite face of an adjacent tile. Since the corrugated form of the upper face of the tile is determined by the form of the upper edges 35 of plates 28, said edges having a corrugated form, as seen in Fig. 4. As will later be seen, the action of trowel 16 on the tile smoothens the upper face thereof to the level of the serrations or undulations in edges 35 of plates 28.

The pallet 13 is positioned in the space defined by the components of mold 12 and is formed of thin metal plate of a size to slidingly fit in said space. The pallet is provided with undulations according to the form desired for the under face of tile 32. The position of said pallet relative to the top edge of the mold determines the thickness of the tile to be molded. Such positioning of the pallet is afforded by the vibratory support means 14.

The means 14 is shown as comprising two similar units 36. Each said unit comprises two vertical rods 37 that extend from beneath the bed 11 through two of the transversely spaced brackets 25, as best seen in Fig. 5. The upper ends of said rods are threaded and suitable adjusting nuts 38 are provided on said threaded ends to effect and lock the vertical adjustment of the rods relative to shoulders 39 on said brackets. The four upper ends of rods 37 constitute four spaced points of support for pallet 13. The rods 37 of each unit 36 are connected beneath the bed 11 by a cross bar 40. An electrical vibrator 41 of conventional design is mounted on each cross bar and, through said cross bars and rods 37 imparts vibration to pallet 13. It will be noted that said rods 37 are arranged in rectangular relationship to be adjacent the corners of the pallet which, therefore, receives vibration throughout its area which effects a more rapid elimination of air bubbles and a more efficient settling of the cement on the pallet.

Figure 3:
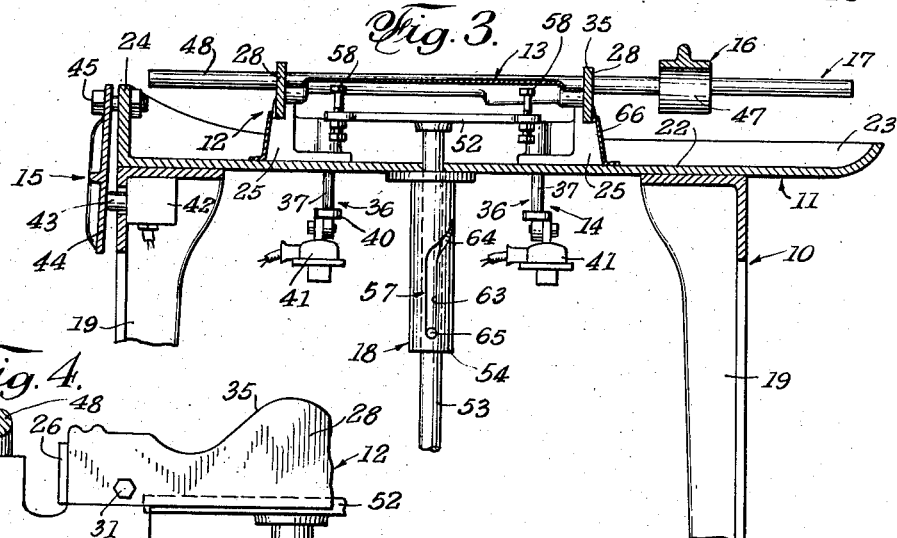
Fig. 3 is a longitudinal sectional view as taken on line 3—3 of Fig. 2, the lower portion of the machine being broken away.

Since, when moving the trowel 16 across pallet 13 and mold 12, the operator, from his position at the left side of the machine as in Figs. 1, 2 and 3, moves his body back and forth in alternate or continuous contact with bed wall 24, the means 15 for controlling the vibrators 41 is mounted on the outer face of said wall. Therefore, operation of the vibrators results from movements of the body entailed in the process of manipulating the trowel and not from a separate control, the operation of which may be overlooked. As shown, a switch 42 is mounted so that its control button 43 extends through the upper portion of the leg side 19 beneath wall 24, and an elongated transversely disposed switch plate 44 is suspended from bolts 45 in depending engagement with switch button 43. It will be evident that body pressure on said plate 44 will depress the switch button to close switch 42 and that said switch, which is a commercial item, may embody a return spring that returns the switch to its normally-open position. If desired, such return spring or springs may be provided for plate 44. The electric circuit through switch 42 is, of course, connected to vibrators 41 in any feasible manner so that said vibrators will be set into operation each time the operator depresses plate 44 when he leans forward during manipulation of the trowel.

The trowel 16, as best seen in Figs. 2 and 5, comprises an elongated metal member 46 that has an under face 47 which conforms in its various undulations to those of plate edges 35. Thus, if suitably guided, said trowel can be moved back and forth over the face of the mold 12 to trowel the upper face of the tile 32 so that said face takes the form of trowel face 47. Manipulation of the trowel is effected by means of laterally extending handles 47a that are grasped by the operator from his station as before indicated.

The trowel-guide means 17 performs two important functions—one, guides the trowel 16 at the proper plane of movement so as to just clear the plate edges 35 and thus trowel the upper tile face to substantially the level and form of said edges, and two, maintains a constant center position of the trowel so that the under face 47 of the same accurately transversely aligns with said edges 35.

As shown, the means 17 comprises a pair of parallel and longitudinal rods 48 that are transversely spaced to reside on opposite sides of the mold 12. Said rods are preferably mounted on the corner brackets 25 which are provided with lateral portions 49 in which are received posts 50 connected to said rods. Said rods are preferably round-sectioned or, at least, have their upper portions rounded over. The trowel, between member 46 and handles 48, is provided with downwardly facing half-round recesses 51 that fit over round rods 48. Because of such interfit of rods and recesses, a non-binding and accurately guided engagement of guide rods and trowel is provided. Also, the rods can be kept clear of cement which has little tendency to stick to the rounded surfaces thereof and, moreover, is easily dislodged by the trowel.

The pedal operated means 18 comprises a pallet and tile lifter plate 52 disposed between the bed 11 and the pallet 13, a lifter rod 53 extending downward from said plate through said bed and through a guide bearing 54, a bearing 55 in bridge 20 for the lower end of rod 53, means 56 to lift said rod and the lifter plate thereon, and means 57 to rotate said rod on the plate during lifting thereof.

The plate 52 is provided with suitably placed and adjustable members 58 that may be locked to the plate in adjusted position so that the same are normally spaced below pallet 13 and which will engage said pallet when the plate is raised by the means 56. The height of adjustment of members 58 is made according to the undulated form of the pallet, as seen in Fig. 5. Therefore, said members 58 constitute pallet-supporting means to hold the latter and a tile thereon firmly, after removal of the same from the mold, as shown in Fig. 1.

The means 56 comprises a foot pedal 59 on a pivot 60 provided on bridge 20 and extending from the side of the machine where the same is accessible to the operator, a cable connection 61 between said pedal and a block 62a on rod 53 between bearings 54 and 55, and suitable pulleys 62 over which said cable connection is trained.

Normally, the pedal is held raised by the weight of plate 52 and rod 53 or a suitable spring may be employed for this purpose. In any case, depression of the pedal causes elevation of lifter plate 52.

The means 57 comprises an elongated slot 63 formed in guide bearing 54, the lower portion of said slot being longitudinal and the upper portion being formed helically to constitute a cam slot 64 extending through 90° of the circumferential extent of bearing 54. A radial pin 65 affixed to rod 53 operates in said slot and induces the mentioned 90° rotation of said rod when moved in cam slot 64.

Since the undulations of the tile must necessarily be longitudinal with respect to the operator so that troweling may be performed with natural back and forth movement of the body and/or hands, to lift such a tile straight out from its mold presents the tile to the operator in such a position that, when the tile-mounted pallet is lifted from lifter plate 52 for deposit on a drying rack, it is necessary for the operator to so twist his body or turn his hands, or leave his station to avoid such twisting and turning, that an inefficient and body-tiring operation results. By means of the present machine, which turns the tile-mounted pallet a quarter turn, the transfer of the same from the machine to a drying rack is not only facilitated but is less tiring to the operator whose production of tiles will, therefore, increase materially.

The plates 28 may become worn on the inner sides of their upper edges 35. The life thereof may be doubled by a simple interchange of said plates. The longitudinal portion of slot 57 guides the tile straight out of the mold before the cam portion 64 turns the same. This minimizes wear on the mold. By enclosing the mold as by sheet metal walls 66, cement, in large measure, is kept from entering the mold below the pallet. Since rod 53 turns, as described, the cable connection 61 is strung through openings in block 62a so that the cable may adjust itself with respect to the pulleys 62 that are mounted on guide bearing 54.

In the normal operation of the machine, the operator places "mud" or cement in the mold to more than fill the same and, as the pallet is being vibrated, passes the trowel back and forth over the mold until satisfied with the smoothness of the upper tile surface. He then removes the tile and pallet as described, places an empty pallet in the mold and proceeds as before.

While I have illustrated and described what I now contemplate to be the best mode of carrying out my invention, the construction is, of course, subject to modification without departing from the spirit and scope of the invention. It is, therefore, not desired to restrict the invention to the particular form of construction illustrated and described, but to cover all modifications that may fall within the scope of the appended claims.

Having thus described the invention, what I claim and desire to be secured by Letters Patent is:

1. In a molding machine having a top-open rectangular mold enclosed by four marginal plates to define the areal extent of an article molded therein and a pallet loosely fitted within said mold and normally constituting the bottom thereof, means to remove the pallet and a molded article thereon from its normal position to a position clear of the mold plates and comprising a pallet lifting plate member disposed beneath the pallet, a guided rod extending downwardly from said plate member, a foot pedal, means interconnecting said pedal and said rod to cause lifting of the rod upon depression of the pedal, a guide bearing for said rod, and pin-and-slot means interconnecting the bearing and the rod to cause turning of the rod and of the pallet after the latter is clear of the mold plates and during the final portion of the lifting movement of said rod.

2. A molding machine of the character described comprising a bed, a top-open mold mounted on the bed and including a movable pallet constituting the bottom of the mold, said mold including fixed end plates between which the pallet moves, means to move the pallet between a position nearer the bed and below the upper edges of said end plates to a position above and clear of said upper plate edges to thereby move an article formed in said mold outwardly thereof, guide means to retain the pallet-moving means non-rotational during the portion of the pallet movement that first moves the pallet and the molded article thereon clear of the end plates of the mold, and cam means to rotate the pallet and the article thereon while above said end plates to a position wherein the ends of said article that are formed by said end plates are transverse to said end plates, a pallet-support rod being provided that passes through the bed and the latter being provided with a bearing in which the same moves, the mentioned guide and cam means comprising a cam slot in the bearing that is formed to have a longitudinal portion and a helical upper extension of said portion, the rod being provided with a radial pin operatively engaged in said slot.

References Cited in the file of this patent

UNITED STATES PATENTS

| | | |
|---|---|---|
| 790,661 | Reed | May 23, 1905 |
| 1,114,168 | Melde | Oct. 20, 1914 |
| 1,533,649 | Hopkins | Apr. 14, 1925 |
| 1,605,801 | Warren | Nov. 2, 1926 |
| 1,958,199 | Morin | May 8, 1934 |
| 2,070,956 | Pelton | Feb. 16, 1937 |
| 2,447,153 | Barber | Aug. 17, 1948 |
| 2,523,737 | Tourres | Sept. 26, 1950 |

FOREIGN PATENTS

| | | |
|---|---|---|
| 181,133 | Great Britain | June 12, 1922 |